(12) United States Patent
Nakayama et al.

(10) Patent No.: US 6,587,163 B1
(45) Date of Patent: Jul. 1, 2003

(54) LIQUID CRYSTAL DISPLAY DEVICE

(75) Inventors: Takanori Nakayama, Mobara (JP); Hikaru Ito, Mobara (JP); Kimitoshi Oogiichi, Mobara (JP); Kuniyuki Matsunaga, Ohmura (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/597,574

(22) Filed: Jun. 20, 2000

(30) Foreign Application Priority Data

Jun. 22, 1999 (JP) ............................................. 11-174807

(51) Int. Cl.⁷ ............................................. G02F 1/1343
(52) U.S. Cl. ......................................... 349/43; 349/140
(58) Field of Search .............................. 349/43, 38, 110

(56) References Cited

U.S. PATENT DOCUMENTS 5,631,753 A * 5/1997 Hamaguchi et al.
6,115,087 A * 9/2000 Ohi
6,323,918 B1 * 11/2001 Yoshioka et al. ............. 349/48

FOREIGN PATENT DOCUMENTS

JP 10-161154 12/1996

* cited by examiner

*Primary Examiner*—Robert H. Kim
*Assistant Examiner*—P. R. Akkapeddi (57) ABSTRACT

A liquid crystal display device, or more particularly, an active matrix type liquid crystal display device having a pixel electrode formed in a pixel field defined on one of two transparent substrates opposed to each other with a liquid crystal layer between them. The pixel electrode is overlapped a signal line, which is formed in a portion of the one transparent substrate coincident with a black matrix, with a dielectric between them. The width of the overlap is set to a value satisfying a condition that an electric field induced between the signal line and pixel electrode will not invade into the pixel field defined with the black matrix. Owing to the structure, inhomogeneous luminance caused by a source electrode of a thin film transistor can be avoided. Moreover, inhomogeneous luminance caused by a capacitive element can be avoided.

10 Claims, 5 Drawing Sheets

LIQUID CRYSTAL DISPLAY DEVICE

BACKGROUND OF THE INVENTION

1. Field of the Invention

The present invention relates to a liquid crystal display device, or more particularly, to an active matrix type liquid crystal display device.

2. Description of the Related Art

The active matrix liquid crystal display device has a plurality of gate signal lines, a plurality of drain signal lines, and pixel fields. The plurality of gate signal lines is extended in an x direction on a surface of one of two transparent substrates, which are opposed to each other with a liquid crystal layer between them, on the side of the liquid crystal layer. The plurality of gate signal lines are juxtaposed in a y direction orthogonal to the x direction. The plurality of drain signal lines is extended in the y direction and juxtaposed in the x direction while electrically isolated from the gate signal lines. The pixel fields are each defined by one pair of gate signal lines and one pair of drain signal lines. Arranged in each pixel field are a thin film transistor to be driven with application of a scanning signal over one of the pair of gate signal lines, and a pixel electrode to which a video signal is applied over a drain signal line via the thin film transistor.

In the foregoing structure, the pixel electrode is connected to one of the electrodes of the thin film transistor (source electrode) through a contact hole bored in an insulating film interposed between the electrode of the thin film transistor (source electrodes) and the pixel electrode. Part of the pixel electrode is extended to the other gate signal line. A capacitive element is formed using the insulating film interposed between part of the pixel electrode and the gate signal line as a dielectric. The capacitive element has the ability to hold (maintain) the video signal, which is applied to the pixel electrode, for a relatively long period of time even when the thin film transistor is turned off (becomes nonconducting).

However, the liquid crystal display device having the foregoing structure has a drawback that the gate-source capacitance of the thin film transistor in each pixel field cannot be set to a fixed value and the luminance of a display image therefore becomes inhomogeneous. Studies made in efforts to look into the causes of this drawback have demonstrated that: when the source electrode of the thin film transistor formed as part of the contact reaching the pixel electrode is formed through selective etching, the source electrode is unexpectedly hollowed and an area by which the source electrode is in contact with a semiconductor layer cannot be set to a fixed value.

Moreover, a variation in luminance appears at a point in each pixel which coincides with a capacitive element in each pixel field. Studies made in efforts to look into the causes of this drawback have demonstrated that an electric field is induced in parallel with a substrate between a gate signal line, which overlaps a pixel electrode, and the pixel electrode, and then invades into a substantial pixel field.

SUMMARY OF THE INVENTION

The present invention attempts to break through the aforesaid situation. An object of the present invention is to provide a liquid crystal display device capable of avoiding inhomogeneous luminance caused by a source electrode of a thin film transistor.

Another object of the present invention is to provide a liquid crystal display device capable of avoiding inhomogeneous luminance caused by a capacitive element.

A brief description will be made of representative aspects of the present invention below.

(1) A liquid crystal display device in accordance with the present invention has a semiconductor layer formed on a gate signal line with an insulating film between them, and a thin film transistor formed on the semiconductor layer, and having a first electrode connected on a drain signal line, and a second electrode connected to a pixel electrode. The second electrode has an extension that extends beyond the semiconductor layer and is connected to the pixel electrode through the extension. Moreover, the second electrode fans out on the semiconductor layer.

In the thus structured liquid crystal display device, the second electrode formed on the semiconductor layer have a sufficient unoccupied space preserved outside its contour. It therefore does not take place that an etching solution stagnates during formation of the second electrode through selective etching. Etching can therefore be performed according to a predetermined pattern. Consequently, the capacitance preserved between the gate electrode of the thin film transistor and the first electrode can be set to a fixed value. Eventually, the inhomogeneous luminance can be avoided.

(2) Moreover, a liquid crystal display device in accordance with the present invention has a pixel electrode formed in a pixel field defined on one of transparent substrates opposed to each other with a liquid crystal layer between them. Moreover, a black matrix for defining pixel fields is formed on the other transparent substrate. The pixel electrode is overlapped a signal line, which is formed in a portion of the one transparent substrate coincident with the black matrix, with a dielectric between them, whereby one of conducting surfaces of a capacitive element is formed. The width of the overlap is determined so that an electric field induced between the signal line and pixel electrode will not invade into the adjoining pixel field defined with the black matrix.

In the thus structured liquid crystal display device, the electric field induced between the signal line and pixel electrode will not serve as a noise to adversely affect the pixel field. Consequently, the variation in luminance will not take place.

Other objects and structures of the present invention, and operations and advantages to be exerted by the present invention will be apparent from the description to be made in conjunction with embodiments.

DETAILED DESCRIPTION OF THE PREFERRED EMBODIMENTS

Embodiments of the present invention will be described with reference to the drawings.

Figure 2:
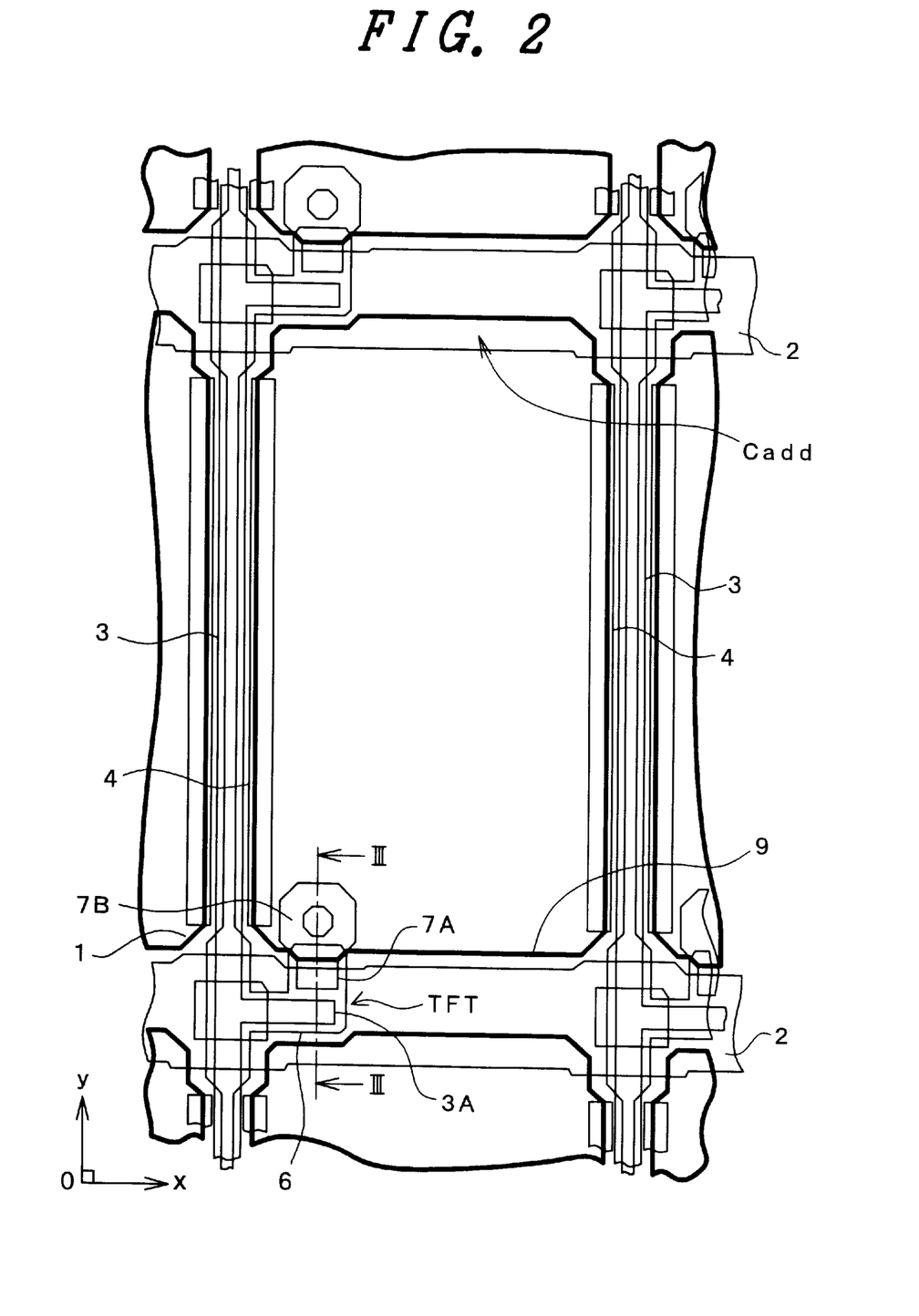
FIG. 2 is a plan view schematically showing the structure of a pixel field in the liquid crystal display device in accordance with the embodiment of the present invention.
Figure 3:
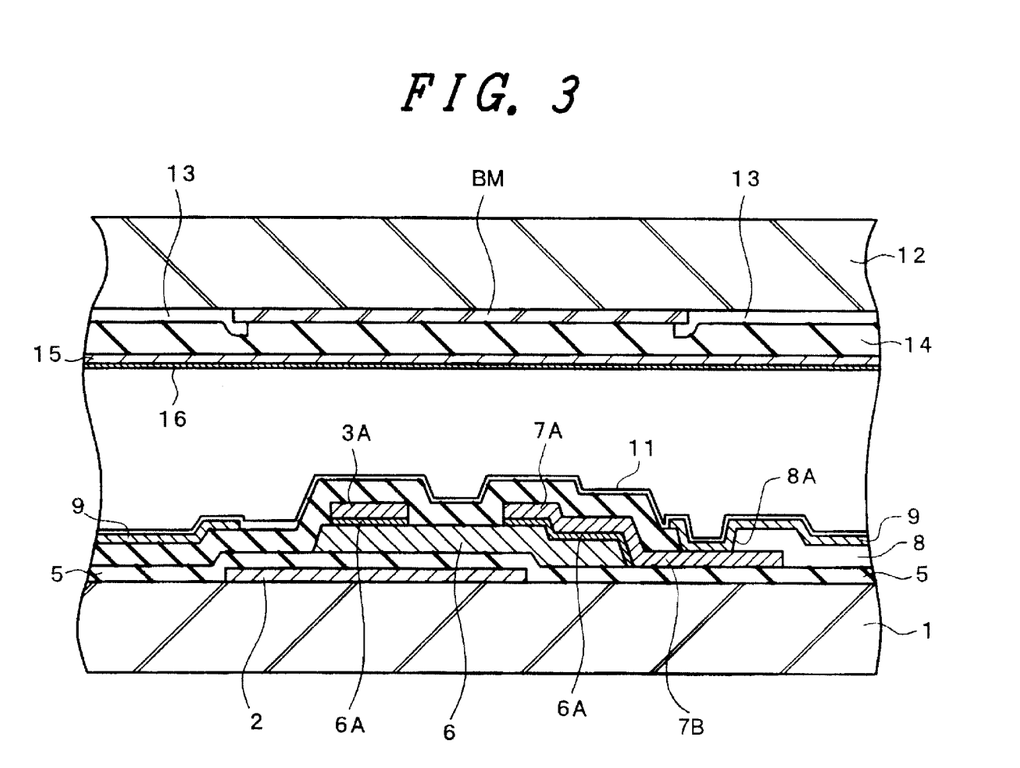
FIG. 3 is a sectional view of a III—III cutting plane of the structure shown in FIG. 2.

FIG. 2 shows the structure of one pixel field in a liquid crystal display device in accordance with the present invention. FIG. 2 is a plan view showing the surface of one of two transparent substrates, which are opposed to each other with a liquid crystal layer between them, on the side of the liquid crystal layer. FIG. 3 shows a III—III cutting plane of the structure shown in FIG. 2 together with the other transparent substrate.

In FIG. 2 and FIG. 3, gate signal lines 2 are extended in an x direction and juxtaposed in a y direction on the face of one transparent substrate 1. The gate signal lines 2 are made of, for example, chromium (Cr).

The gate signal lines 2 are formed to enclose rectangular fields in cooperation with drain signal lines 3 to be described later (extended in the y direction and juxtaposed in the x direction). One rectangular field serves as a pixel field. A light interceptive layer 4 is formed adjacently to a drain signal line 3 in each pixel field. The light interceptive layers 4 are formed at the same time as, for example, the gate signal lines 2 (the light interceptive layers 4 are therefore made of the same material as the gate signal lines 2).

The light interceptive layers 4 fill, like a black matrix BM to be described later, the role of substantially defining the pixel fields. The formation of the light interceptive layers on the transparent substrate 1 on which pixel electrodes 9 to be described later are formed ensures a success in forming the pixel electrodes without any displacement.

The surface of the transparent substrate 1 having the gate signal lines 2 and light interceptive layers 4 formed thereon are wholly coated with an insulating film 5 (see FIG. 3) made of, for example, silicon nitride (SiN). The insulating film 5 serves as an interlayer dielectric between the drain signal lines 3 to be described later and the gate signal lines 2. Moreover, the insulating layer 5 serves as gate insulating films of thin film transistors TFT to be described later. Besides, the insulating layer 5 serves as dielectrics of added capacitors Cadd to be described later.

The thin film transistor TFT is formed on a gate signal line 2 at the left lower corner of each pixel field in the drawing. In each pixel field, a semiconductor layer 6 made of, for example, an amorphous silicon (a-Si) is formed on the insulating film 5. A drain electrode 3A and a source electrode 7A are formed on the face of the semiconductor layer 6. This results in a metal-insulator-silicon (MIS) transistor of a reverse stagger structure whose gate electrode is realized with part of the gate signal line 2 and whose gate dielectric is realized with part of the insulating film 5. The drain electrodes 3A and source electrodes 7A of the MIS transistors are formed at the same time as the drain signal lines 3 to be described later (the drain electrodes 3A and source electrodes 7A are therefore made of the same material as the drain signal lines 3).

The semiconductor layer 6 is formed to underlie not only the thin film transistor TFT but also an intersection between the gate signal line 2 and drain signal line 3 to be described later. Moreover, the semiconductor layer 6 is extended to underlie the drain signal line 3.

Reasons why the semiconductor layer 6 is formed in this way are to reinforce the interlayer dielectric between the drain signal line 3 and gate signal line 2 and to avoid disconnection of the drain signal line 3 derived from a step.

The drain signal lines 3 are made of, for example, chromium (Cr), extended in the y direction, and juxtaposed in the x direction. Each drain signal line 3 has a portion thereof extended over the face of the semiconductor layer 6 on which the thin film transistor TFT is formed, whereby the drain electrode 3A of the thin film transistor TFT is realized. The source electrode 7A of the thin film transistor TFT opposed to the drain electrode 3A is formed simultaneously with the drain signal line 3.

A contact layer 6A is formed as an interface between the drain electrode 3A or source electrode 7A and the semiconductor layer 6, and realized using an n-type impurity as a dopant (see FIG. 3). Specifically, an n-type impurity is doped into the semiconductor layer 6 by a predetermined depth from the surface of the semiconductor layer. The drain electrode 3A and source electrode 7A are then formed. Thereafter, an n-type impurity layer that is not masked with the drain electrode 3A and source electrode 7A but bared is removed through etching. In the thus formed thin film transistor TFT, a length by which the drain electrode 3A and source electrode 7A are opposed to each other is regarded as the width of a channel, and a distance between them is regarded as the length of the channel.

In the present embodiment, the drain electrode 3A and source electrode 7A are arranged so that the channel width of the thin film transistor TFT will be in parallel with the longitudinal direction of the gate signal line 2. The source electrode 7A is therefore projected orthogonally to the longitudinal direction of the gate signal line 2 with the width thereof unchanged towards the pixel field in parallel with the longitudinal direction of the drain signal line 3. The source electrode 7A is provided with an extension 7B of a relatively large area that is in contact with the pixel electrode 9 to be described later.

Figure 1:
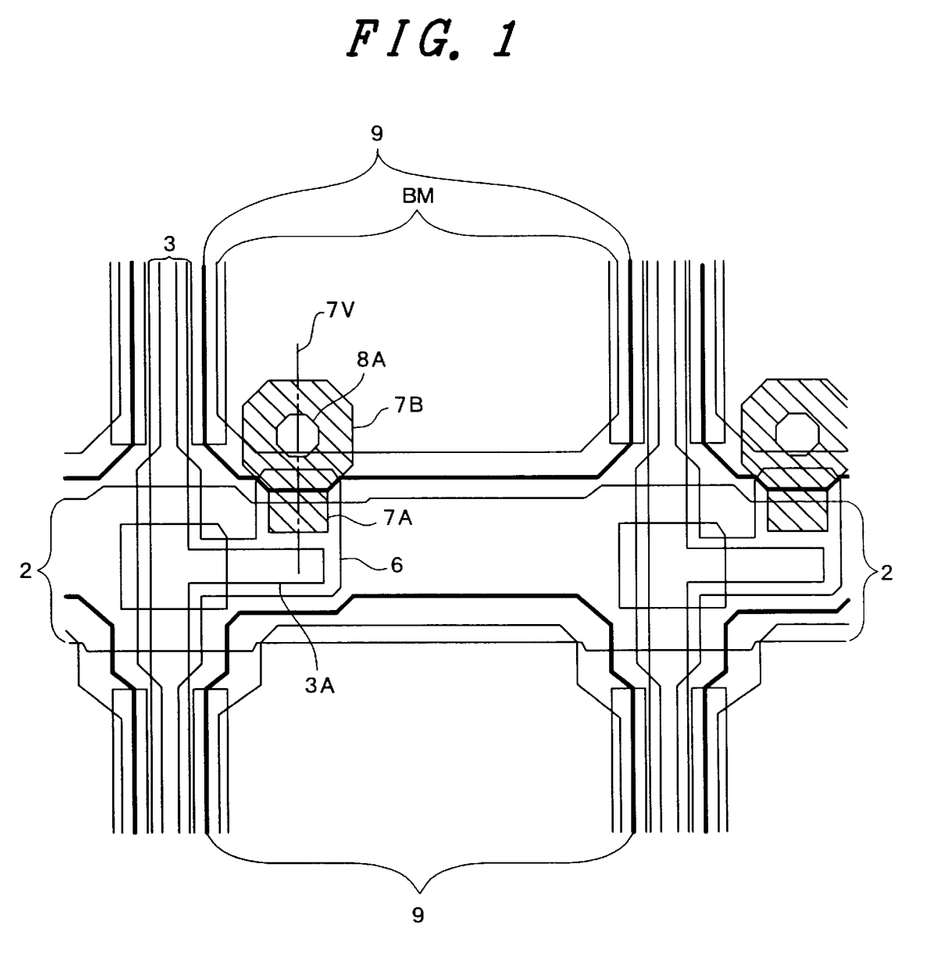
FIG. 1 is a plan view showing the detailed structure of a pixel field in a liquid crystal display device in accordance with an embodiment of the present invention.

FIG. 1 is an enlarged view of the thin film transistor TFT and its surroundings, showing a more practical pattern.

In FIG. 1, the source electrode 7A is projected towards the pixel field in parallel with the longitudinal direction of the drain signal line 3 with the width thereof unchanged. The source electrode 7A has the extension 7B that fans out on the semiconductor layer 6, and has a relatively large area.

The semiconductor layer 6 is formed to protrude slightly from the gate signal line 2 towards the pixel field. Referring to FIG. 1, the source electrode 7A has the extension that fans out on the protruding portion of the semiconductor layer 6.

The extension 7B of the source electrode 7A is octagonal. One side of the extension 7B serves as a border relative to the source electrode 7A. In other words, the source electrode 7A projected towards the pixel field with the width unchanged shares one side of the (octagonal) extension 7B. Both sides adjoining the shared side of the extension 7B serving as the border define the contour of the portion of the extension 7B that fans out.

The sides adjoining the shared side of the extension 7A and defining the contour of the portion of the extension 7B that fans out cross sides of the semiconductor layer 6 extended in a direction in which the source electrode 7A projects. In other words, some of all the sides of the contour of the source electrode 7A are crossing some of all the sides of the contour of the semiconductor layer 6 at an obtuse angle.

Owing to the foregoing structure, it can be avoided that the source electrode 7A is unexpectedly hollowed at any position on a side of the portion of the extension, which fans out, crossing a side of the semiconductor layer 6 during selective etching.

This is presumably because the periphery of the source electrode 7A on the semiconductor layer 6 spreads rather spaciously, and an etching solution does not stagnate during selective etching of the source electrode 7A. This means that an area by which the source electrode 7A abuts on (in contact with) the semiconductor layer 6 will not change despite the foregoing countermeasure against unexpected hollowing. Consequently, the thin film transistor TFT can be formed with the source-gate capacitance Cgs thereof set to a fixed value.

Figure 4:
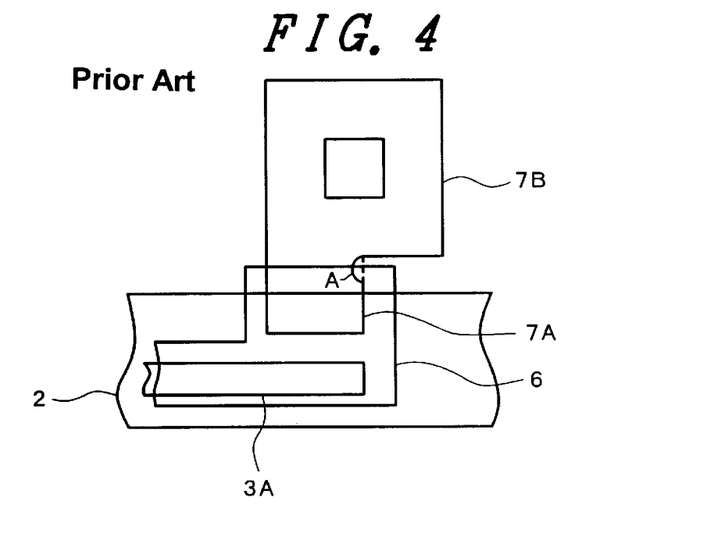
FIG. 4 is a plan view showing an example of the structure of a pixel field in a conventional liquid crystal display device.

FIG. 4 shows a conventional pattern defining the source electrode 7A and its extension 7B. According to the conventional pattern, the source electrode 7A is hollowed at a position A during etching. An area by which the source electrode 7A abuts on (in contact with) the semiconductor layer 6 is changed, and the gate-source capacitance Cgs of the thin film transistor TFT is changed.

As apparent from FIG. 4, the position at which the source electrode 7A is hollowed unexpectedly during etching is located in a very narrow space created near the semiconductor layer 6 and source electrode 7A. This is presumably the reason why an etching solution stagnates during selective etching of the source electrode 7A.

Figure 5:
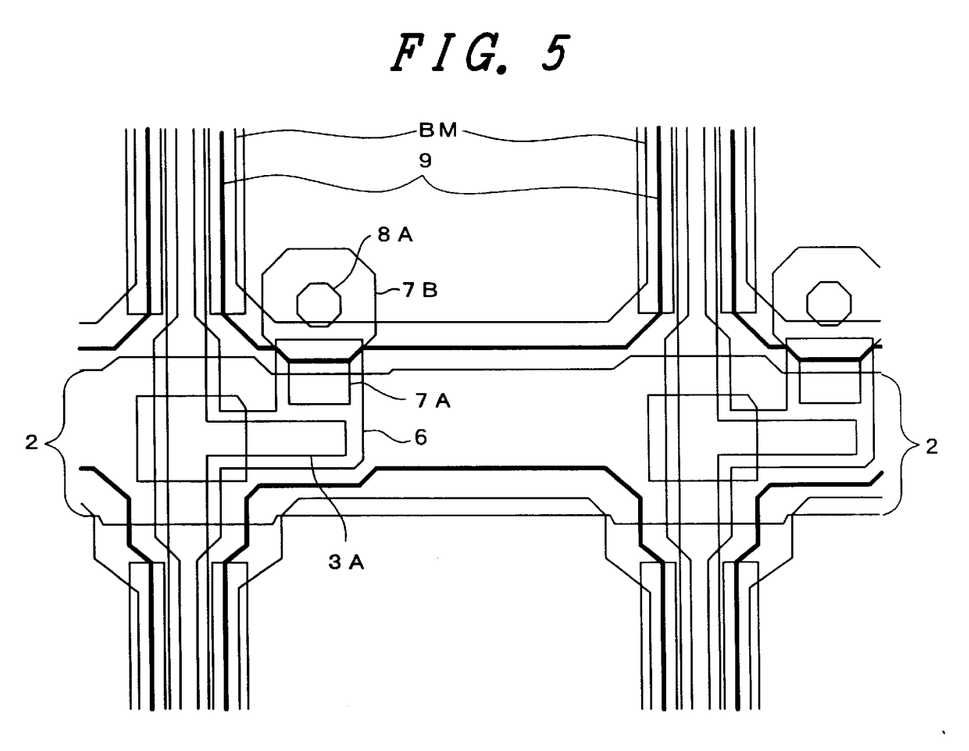
FIG. 5 is a plan view showing the details of the structure of a pixel field in a liquid crystal display device in accordance with another embodiment of the present invention.

In FIG. 1, the semiconductor layer 6 has some of corners thereof cut out. The sides of the portion of the extension of the source electrode 7A that fans out cross the cut corners of the semiconductor layer 6. Strictly speaking, it may not be said that the sides of the extension of the source electrode 7A cross some sides of the semiconductor layer 6 at an obtuse angle. However, the cut corners of the semiconductor layer 6 are comparable to part of a quite microscopic pattern. Cutting will not change the characteristics of the semiconductor layer 6 serving as the channel of the thin film transistor TFT. The thin film transistor TFT shown in FIG. 1 functions in the same manner as, for example, the one shown in FIG. 5 (some corners of the semiconductor layer 6 are not cut out).

The extension 7B of the source electrode 7A is octagonal shaped, and the center of the extension 7B is located on a virtual line 7V as drawn in FIG. 1 that passes through the center of a channel that extends from the drain electrode 3A to the source electrode 7A. The virtual line 7V may also be a symmetrical axis of the source electrode 7A (on the semiconductor layer 6) and the extension 7B. Therefore, the extension 7B of the source electrode 7A (a contact portion to be brought into contact with the pixel electrode 9 to be described later) can be located near the channel of the thin film transistor TFT. This pattern is effective from an electrical viewpoint. Moreover, the extension 7B of the source electrode 7A may not protrude to an opening of the black matrix BM to be described later (substantially comparable to a pixel field).

The thus processed transparent substrate 1 is wholly coated with a protective film 8 (see FIG. 3) made of, for example, SiN. An octagonal contact hole 8A analogous to the extension 7B is formed in the center of a portion of the protective film 8 coincident with the extension 7B of the source electrode 7A. A transparent pixel electrode 9 made of, for example, indium tin oxide (ITO) is formed on the protective film 8. The pixel electrode 9 is formed within the field enclosed with the adjoining gate signal lines 2 and adjoining drain signal lines 3. The right and left sides of the pixel electrode 9 are located substantially on the center axes of the light interceptive layers 4.

The pixel electrode 9 is connected to the extension 7B of the source electrode 7A through the contact hole 8A while being formed. The pixel electrode 9 overlaps over the whole width thereof the other gate signal line 2 adjoining the gate signal line on which the thin film transistor TFT for applying a video signal to the pixel electrode 9 is formed. A capacitive element Cadd is realized with the overlap. The capacitive element Cadd has the insulating film 5 interposed between the gate signal line 2 and pixel electrode 9 and the protective film 8 as dielectrics thereof. The capacitance of the capacitive element has relation to the area of the overlap of the pixel electrode 9 and gate signal line 2. The capacitive element Cadd helps hold a video signal in the pixel electrode 9 for a relatively long period of time even after the thin film transistor TFT is turned off.

The pixel electrode 9 serving as one of the conducting surfaces of the capacitive element Cadd (portion overlaid the gate signal line 2) is overlaid a portion of the gate signal line, on which the thin film transistor TFT is formed, to such an extent that it lies closely to the thin film transistor. In contrast, the pixel electrode 9 is overlaid the other portion of the gate signal line, on which no thin film transistor is formed, to such an extent that it lies a bit above the lower side of the thin film transistor. In other words, the pixel electrode 9 serving as one conducting surface of the capacitive element Cadd is overlaid one portion of the gate signal line 2, on which the thin film transistor TFT is formed, to the greatest possible extent in terms of the space (see a width W of superposition in FIG. 6). This is intended to overlap the pixel electrode 9 and gate signal line 2 by a sufficiently large area. The pixel electrode 9 is overlaid the other portion of the gate signal line 2, on which no thin film transistor TFT is formed, to such an extent that it will not occupy a very large area of the gate signal line 2. Thus, the pixel electrode 9 is constructed to be small as a whole.

Figure 6:
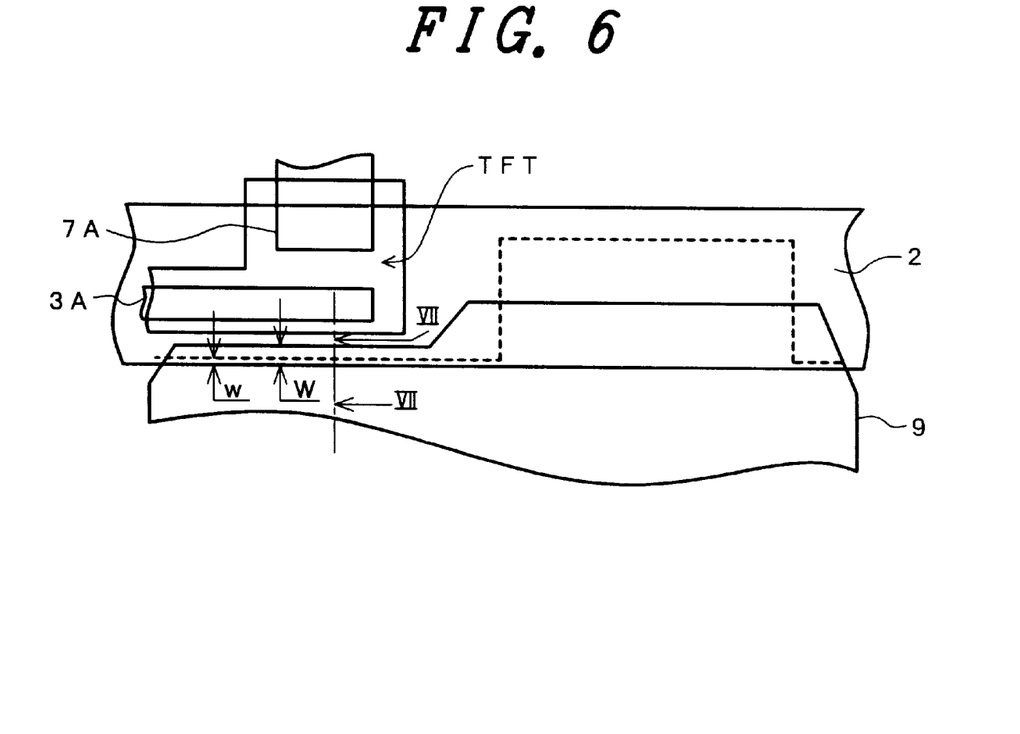
FIG. 6 is a plan view of a major portion of the liquid crystal display device in accordance with the present invention for clarifying a difference from the conventional liquid crystal display device.

FIG. 6 shows the pixel electrode 9, which serves as a conducting surface of the capacitive element Cadd, in comparison with a conventional one (indicated with a dashed line). The conventional pixel electrode 9 is overlaid a portion of the gate signal line 2, on which the thin film transistor TFT is formed, by a small width w. The overlap of the pixel electrode and the portion of the gate signal line 2 on which the thin film transistor TFT is formed is intended to prevent occurrence of a light leakage between the gate signal line 2 and pixel electrode 9. The width w of the overlap is set to a very small value. For ensuring a required capacitance, the pixel electrode 9 is overlaid the other portion of the gate signal line 2, on which no thin film transistor is formed, to a great extent. The portion of the gate signal line 2 greatly overlaid with the pixel electrode and the corresponding portion of the pixel electrode substantially constitute the capacitive element Cadd.

Figure 7:
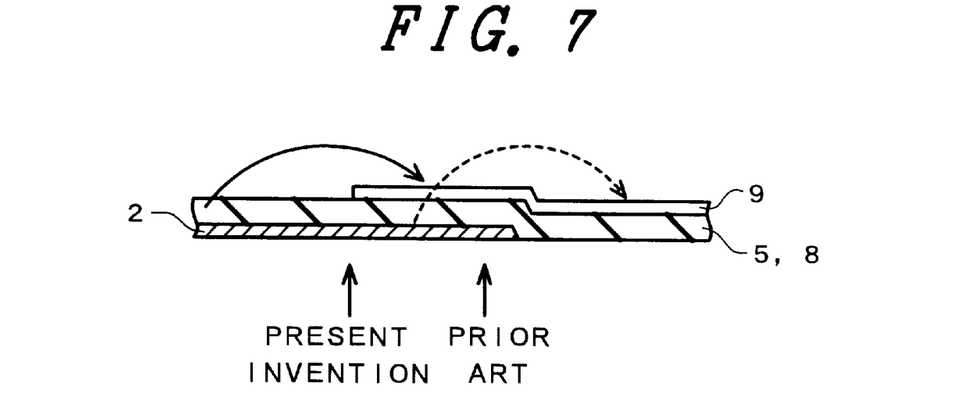
FIG. 7 is an illustrative view showing a VII—VII cutting plane of the major portion shown in FIG. 6, and thus explaining the advantages to be exerted by the liquid crystal display device in accordance with the present invention.

FIG. 7 shows a VII—VII cutting plane of the capacitive element shown in FIG. 6. In the drawing, an electric field (indicated with an arrow) is induced due to a potential difference between the gate signal line 2 and pixel electrode 9. In the case of the conventional pixel electrode 9 part of which is insufficiently overlaid the gate signal line 2, an electric field (indicated with an arrow drawn with a dashed line) apparently invades into the pixel field (an opening of the black matrix BM). The electric field permeates through a space between the pixel electrode 9 and a common electrode 15 that will be described later. The electric field acts as a noise relative to an electric field that controls the transmittance of a liquid crystal layer existent between the pixel electrode and common electrode, and causes the luminance of a display image to vary.

According to the present invention, a width by which the pixel electrode 9 is overlaid the portion of the gate signal line 2 on which the thin film transistor TFT is formed is set to a sufficiently large value for fear an electric field induced between the gate signal line 2 and pixel electrode 9 should invade into the pixel field defined with the black matrix BM.

Assume that the overlap of the pixel electrode 9 and gate signal line 2 is opposed to the thin film transistor TFT formed on the gate signal line 2. In this case, the width of the overlap is set to a minimum value in consideration of a space existent between the overlap and the thin film transistor. The minimum width W corresponds to 70% or more of a cell gap. It can thus be prevented that an electric field induced between the gate signal line 2 and pixel electrode 9 protrudes from the gate signal line 2 and invades into the pixel field. This results in a display image whose luminance will not be discerned to be inhomogeneous. Incidentally, the cell gap refers to the thickness of the liquid crystal layer. The surface of the transparent substrate 1 having the pixel electrodes 9 created thereon is coated with an alignment film 11 that abuts on the liquid crystal layer. The alignment film 11 determines an initial direction in which the liquid crystalline molecules of the liquid crystal layer are aligned.

The thus formed transparent substrate 1 is normally referred to as a TFT substrate. A filter substrate is opposed to the TFT substrate 1 with the liquid crystal layer between them. The black matrix BM for defining the pixel fields is formed on the surface of the transparent substrate 12, which is the filter substrate, on the side of the liquid crystal layer. A color filter 13 of a predetermined color is formed in each opening of the black matrix BM. A flat film 14 is formed to cover both the black matrix BM and color filters 13. A common electrode 14 used in common among the pixel fields and made of, for example, ITO is formed over the flat film 14. The common electrode 15 is coated with an alignment film 16 that abuts on the liquid crystal layer.

As apparent from the above description, according to the present invention, a liquid crystal display device can avoid inhomogeneous luminance caused by a source electrode of a thin film transistor. Moreover, inhomogeneous luminance caused by a capacitive element can also be avoided.

The present invention has been described in relation to the embodiments. The present invention is not limited to the structures of the embodiments. Needless to say, various variants can be constructed without a departure from the gist of the present invention.

What is claimed is:

1. A liquid crystal display device comprising:

a semiconductor layer formed on a gate signal line with an insulating film therebetween; and at least one thin film transistor having a first electrode connected on a drain signal line and a second electrode provided on said semiconductor layer, wherein said second electrode has a body and an extension that is formed above and extends outside said semiconductor layer so as to be connected to a pixel electrode via a contact located outside said semiconductor layer, and said extension of said second electrode is wider than said body of said second electrode and crosses over a contour of said semiconductor layer as said extension extends toward said contact.

2. A liquid crystal display device comprising:

at least one thin film transistor of a reversed stagger structure formed on a semiconductor layer and to be driven with a scanning signal sent over a gate signal line; and a pixel electrode to which a video signal is fed over a drain signal line via one of electrodes of said thin film transistor which are formed in each of a plurality of pixel fields, wherein said one of electrodes of said thin film transistor is formed above and extends outside said semiconductor layer while fanning out toward the outside of said semiconductor layer to be connected to said pixel electrode at the outside of said semiconductor layer.

3. A liquid crystal display device comprising:

a semiconductor layer formed on a gate signal line with an insulating film therebetween; and at least one thin film transistor having a first electrode connected to a drain signal line and a second electrode connected to a pixel electrode, wherein said second electrode has an extension that is formed above and extends outside said semiconductor layer so as to be connected to said pixel electrode through said extension, a contour of said extension crosses a contour of said semiconductor layer at an obtuse angle.

4. A liquid crystal display device comprising:

at least one thin film transistor of a reversed stagger structure formed on a semiconductor layer and to be driven with a scanning signal sent over a gate signal line; and a pixel electrode to which a video signal is fed over a drain signal line via said thin film transistor being formed in each of a plurality of pixel fields, wherein an electrode of said thin film transistor connected to said pixel electrode has an extension thereof that is formed above and extends outside said semiconductor layer while fanning out toward the outside of said semiconductor layer, and said electrode of said thin film transistor and said extension are symmetrical to a virtual line passes through a center of said extension.

5. A liquid crystal display device according to claim 4, wherein said extension is octagonal shaped.

6. A liquid crystal display device comprising:

at least one thin film transistor of a reversed stagger structure having semiconductor layer formed on a gate signal line and a pair of electrodes formed on said semiconductor layer and arranged opposite to one another to form a channel region therebetween on said semiconductor layer, said thin film transistor being driven with a scanning signal sent over said gate signal line; and a pixel electrode, to which a video signal is fed over a drain signal line via said thin film transistor, being formed in each of a plurality of pixel fields, wherein one of said pair of electrodes of said thin film transistor has a body and an extension portion thereof extending in parallel with a channeling direction of said channel region and crossing over a contour of said semiconductor layer, said pixel electrode is connected to said extension portion outside of said semiconductor layer, and said extension portion is wider than said body along a direction perpendicular to said channeling direction.

7. A liquid crystal display device according to claim 6, wherein said extension portion is octagonal shaped and connected to said pixel electrode via a contact.

8. A liquid crystal display device according to claim 6, wherein said semiconductor layer has a protrusion being formed above said gate signal line and protruding along said channeling direction.

9. A liquid crystal display device according to claim 8, wherein a contour of said protrusion of said semiconductor layer crosses along said channeling direction a contour of said extension portion at an obtuse angle.

10. A liquid crystal display device according to claim 6, further comprising an insulating film formed on said gate signal line, wherein said semiconductor layer is formed on said insulating film, and a portion of said extension portion is formed on said insulating film at the outside of said semiconductor layer.

* * * * *